United States Patent [19]

Arseneault et al.

[11] 3,912,144

[45] Oct. 14, 1975

[54] TAPE TRANSPORT FOR MAGNETIC RECORDING WITH A ROTATING HEAD

[75] Inventors: Paul J. Arseneault, Boulder County; Ernest P. Kollar, Wild County, both of Colo.

[73] Assignee: International Business Machines Corporation, Armonk, N.Y.

[22] Filed: Nov. 18, 1974

[21] Appl. No.: 524,845

Related U.S. Application Data

[63] Continuation of Ser. No. 375,966, July 2, 1973, abandoned.

[52] U.S. Cl. .......................... 226/3; 226/7; 226/97; 226/198; 242/76; 360/84; 360/102

[51] Int. Cl.$^2$ .......................................... B65H 23/02

[58] Field of Search ........... 360/84, 102; 226/7, 97, 226/196, 198, 199, 3; 242/76

[56] References Cited

UNITED STATES PATENTS

| | | | |
|---|---|---|---|
| 3,516,146 | 6/1970 | Maxey | 360/84 X |
| 3,850,358 | 11/1974 | Nettles | 226/198 |

*Primary Examiner*—Richard A. Schacher
*Attorney, Agent, or Firm*—Homer L. Knearl

[57] ABSTRACT

The tape transport described herein utilizes a mandrel about which the tape may be helically wrapped. A rotor carrying a magnetic head is mounted between two halves of the mandrel so that as the head rotates, it sweeps out a track at an acute angle relative to the longitudinal dimension of the tape. Further, the transport has continuous compliant guides before and after the tape helically wraps the mandrel so that lateral disturbances and tension disturbances in the tape caused by the tape supply or the tape sink can be decoupled prior to the tape helically wrapping the mandrel. The entire tape transport, including compliant guides and mandrel, supports the tape with air bearings. The air bearing mandrel may be achieved hydrostatically, hydrodynamically or a combination of both. In addition to the guidance of the tape before and after the mandrel, at very high recording densities it may be desirable to add compliant edge guiding on the mandrel itself.

17 Claims, 11 Drawing Figures

TAPE TRANSPORT FOR MAGNETIC RECORDING WITH A ROTATING HEAD

This is a continuation of application Ser. No. 375,966 filed July 2, 1973, now abandoned.

CROSS REFERENCE TO RELATED APPLICATION

Continuous pivotal-and-transverse compliant guides are taught and more completely described in copending commonly assigned application, Ser. No. 335,609, filed Feb. 26, 1973, a continuation-in-part application of Ser. No. 210,034, filed Dec. 20, 1971.

BACKGROUND OF THE INVENTION

1. Field of the Invention

This invention relates to improvement in tape transports. More particularly, the invention relates to an improved tape transport for stabilizing tape helically wrapped about a mandrel where the mandrel flanks the path of a rotating head.

2. History of the Art

Slant track recording on magnetic tape by helically wrapping tape about a mandrel containing a rotating head dates back at least to the early 1950's, as described in the E. E. Masterson U.S. Pat. No. 2,773,120. In Masterson, the tape helically wraps the mandrel approximately 360° and is moved between the take-up and supply reel by a capstan adjacent the mandrel.

Subsequent refinements to the slant track recording tape transports included the addition of air bearing mandrels. Typically the air bearing mandrels were obtained by rotating the mandrel to produce a hydrodynamic air bearing, or by forcing air through holes in the mandrel to produce a hydrostatic air bearing. In addition, there are a few examples of air bearings produced by rotating half of the mandrel to produce a hydrodynamic air bearing which then is forced in various ways under the static half of the mandrel to provide an air bearing there also.

In the area of quidance, idlers and posts have been used immediately adjacent the mandrel to control entry and exit point of the tape about the mandrel. Further, guidance on the mandrel has been added by means of rails helically wrapping the mandrel or a string of guide posts helically wrapping the mandrel.

In moving the slant track technology into digital data recording with high-density data recording requirements, the design of the tape transport must be optimized. Typically, data tracks will be on the order of 15 mils in width and will be abutted so that no space is wasted longitudinally down the length of the tape. In this environment, removing perturbations in motion, tension and stresses in the tape, and laterally guiding the tape relative to the rotating head becomes highly critical. Guidance via idlers or guide posts at the entry and exit points of tape on the mandrel are not adequate. Using a capstan immediately adjacent the entry or exit point on the mandrel also creates severe guidance problems. Guiding about the mandrel with fixed rails or fixed guide posts on the mandrel is not adequate to remove perturbations in the tape caused by the tape itself, the tape supply or the tape sink.

SUMMARY OF THE INVENTION

In accordance with this invention, tape transport in slant track recording apparatus is improved by increasing the stability of the tape along the path of the rotating head. The tape helically wraps a mandrel that supports the tape along the path of the rotating head. The mandrel has two sections each of which flanks a rotor carrying the magnetic head. The tape is moved from a tape source to the mandrel and moved from the mandrel to a tape sink by entry and exit air bearing guides. These entry and exit guides contain continuous compliant edge guides. The guides are pivotally compliant or flexible about an axis perpendicular to the surface of the tape and positioned at the edge of the tape. The guides are also transversely compliant or flexible in a direction across the width of the tape. Further, the guides are of sufficient length that the region of tape helically wrapping the mandrel is dynamically decoupled from and thus substantially free of disturbances in tape motion or position that exist at the tape source or the tape sink.

The stability is increased by providing a stable air bearing mandrel about which the tape is helically wrapped. The air bearing mandrel supports the tape at a uniform height above the mandrel and along the path of the rotating head. The air bearing is produced by holes in the mandrel or by a porous mandrel through which air is forced under pressure. The choice of holes or porosity of the mandrel and air pressure and tape tension are all selected such that the thickness of the air bearing is relatively invariant to variations in tape tension or air pressure producing the air bearing.

Decoupling of the tape path region which wraps the mandrel from tape disturbances at the tape source is accomplished by the continuous compliant guide which is air bearing from the tape source to the mandrel. The continuous compliant guide produces an edge guiding force that is distributed either uniformly along the guided length or slightly stronger at the ends rather than in the middle of the guided length. Continuous compliant guiding tends to distribute position disturbances, tension disturbances and other stress disturbances created at the source before they can reach the region of the tape wrapping the mandrel. A similar continuous compliant guide decouples the tape sink from the tape path region which wraps the mandrel.

The length of the tape path from entry on one guide around the mandrel and exit off the second guide is preferably twice the length of tape edge runout. (Tape edge runout is the waviness in the edge of the tape caused by the tape slitting operation during manufacture of the tape.)

Alternative configurations for obtaining a stable air bearing about the mandrel might include a combination hydrostatic/hydrodynamic air bearing produced by a porous mandrel which is rotated. In this case, the head would be attached directly to the mandrel and no additional rotor would be required. The porosity of the mandrel, air pressure to force air through the porous surface of the mandrel, viscosity of air and finally the rotational velocity of the mandrel all control the stability of the combination hydrostatic/hydrodynamic air bearing produced by a rotating mandrel.

Another alternative for producing the stable air bearing on the mandrel would be to rotate half of the mandrel while holding the other half of the mandrel fixed and using a porous air bearing in the fixed half of the mandrel. The head would be mounted on the rotating half of the mandrel. Combination of the hydrostatic pressure in the fixed half of the mandrel along with the hydrodynamic effect of the rotating mandrel produces a stable air bearing.

The tape source or tape supply may consist of a tape spool. Alternatively, it may consist of a tape spool in combination with a vacuum column. Additional guidance may be provided between the supply spool and the vacuum column to remove position variations in the positioning of the tape supply spool.

The tape sink may be a capstan or a take-up hub. Tension in the tape can be controlled by cooperation between the take-up hub and the supply spool, or the take-up hub and the vacuum column when used.

The great advantage of the invention is that the stability of the tape along the path of the rotating head is very high, and thus the data densities which may be recorded by the rotating head can be very high. The foregoing and other features and advantages of the invention will be apparent from the following more particular description of preferred embodiments of the invention as illustrated in the accompanying drawings.

DESCRIPTION OF PREFERRED EMBODIMENT

Figure 1:
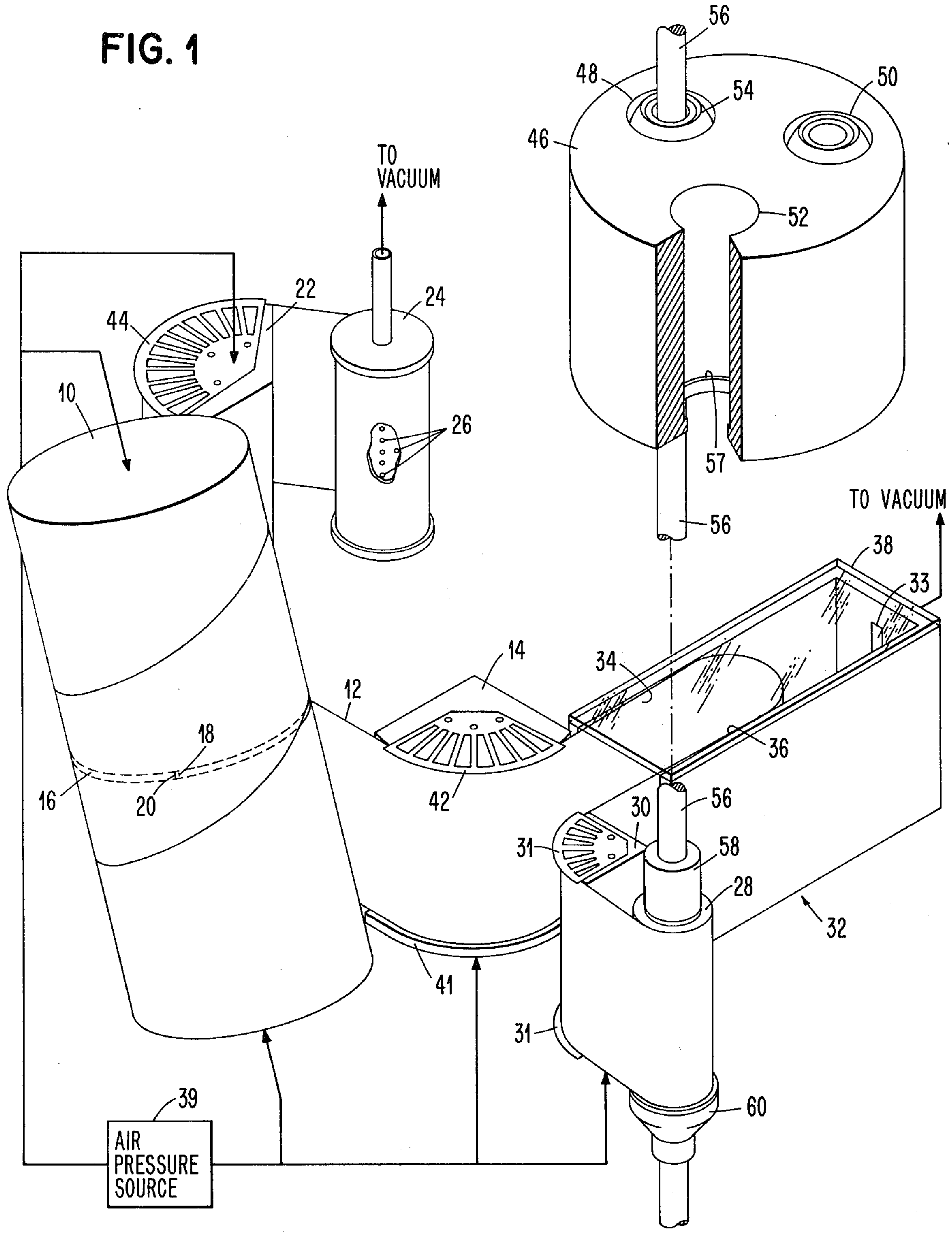
FIG. 1 shows the preferred embodiment of the invention where the tape source is an automatically positioned spool in combination with continuous compliant guides which guide the tape from an automatically positioned spool to a vacuum column, the mandrel and the tape sink.

Referring now to FIG. 1 where the preferred embodiment of the invention is shown in perspective, the tape path section being stabilized, is the section of tape that wraps the mandrel 10. Tape 12 is guided onto the mandrel 10 by entry guide 14. While the tape wraps the mandrel 10, it is scanned by a rotor 16 carrying two magnetic heads 18 and 20 which are the write and read heads respectively. After the tape leaves the mandrel, exit guide 22 guides the tape to the tape sink.

The tape sink in the preferred embodiment is a reel 24. The hub of the reel 24 contains ports 26 through which a vacuum may be pulled to attract the tape and hold the tape 12 on the hub 26. Since take-up reel 24 provides the drive for the tape, it may be looked upon either as a take-up reel in a reel-to-reel drive system, or as equivalent to a capstan in tape drive systems utilizing capstans.

The entry guide 14 guides the tape 12 from the tape source to the mandrel 10. The tape source in the preferred embodiment is a combination of three elements — tape spool 28, spool guide 30 and vacuum column 32.

Tape is supplied to the tape path by the supply spool 28. Spool guide 30 guides the tape 12 from the spool to the vacuum column 32. Vacuum is pulled in column 32 through vacuum port 33. Because the spool 28 is automatically positioned, and because this position may vary in the order of 10 mils along the axis of the spool 28, the entry guide 30 is provided. Entry guide 30 has compliant guides 31 at both edges of the tape to help compensate for positioning of the spool which may be several mils off nominal position.

Vacuum column 32 is a constant force buffer to control tape tension in combination with the take-up reel 24. A secondary function of the vacuum column 32 is to provide additional lateral guidance to the tape 12 prior to the tape reaching the entry guide 14. This is accomplished by dimensioning the vacuum column so that its exit wall has a width corresponding to nominal tape width, while its entry wall 36 has a width corresponding to nominal tape width plus or minus a few mils. The front cover 38, in combination with the back cover 40 (FIG. 2), then acts as a funnel to laterally guide the tape 12 while it is in the vacuum column 32.

Each of the guides 14, 22 and 30, and the mandrel 10, have an air bearing for the tape to ride on as the tape moves across their respective surfaces. In the preferred embodiment of the invention, these air bearings are achieved by holes in the mandrel which are less than 10 mils in diameter through which air is forced under pressure from air pressure source 39.

Edge guiding for both the entry guide 14 and the exit guide 22 is provided by a fixed guide 41 at one edge of the tape and a compliant guide 42 at the other edge of the tape. Exit guide 22 has a similar set of fixed and compliant guides; however, only the compliant guide 44 is visible in FIG. 1. Fixed guide 45 of the exit guide 22 may be seen in FIG. 2.

As previously mentioned, tape 12 is supplied from a spool reel 28 which is automatically positioned adjacent the spool guide 30. Prior to being accessed, spool 28 rests in its own cartridge in a carousel 46. As shown, the carousel 46 has three stations — a read/write station 48, a load-cartridge station 50 and an unload-cartridge station 52. A cartridge would be loaded into the carousel at the cartridge load station 48. The carousel 46 would then be rotated to the read/write station 48 where the spool 28 would be picked from the cartridge 54 and positioned automatically adjacent the spool guide 30. To unload the cartridge, the spool 28 would be reloaded into the cartridge 54 at the read/write station 48 and the carousel rotated to the unload station 52. The cartridge would then be unloaded from the carousel. Of course, each of these stations can operate in parallel while the carousel is stopped. Alternatively, instead of loading and unloading cartridges from the carousel, the carousel might be much larger and permanently carry the cartridges.

Unfastening a spool from its cartridge and positioning it adjacent the spool guide 30 is accomplished by an extending shaft 56 with a coupling 58 to engage the top of the spool 28, push it out the bottom of the carousel and into position adjacent guide 30. At guide 30 the bottom of the spool is pushed against a driving member 60 to provide the drive to wind and unwind the tape from spool 28. The empty cartridge 54 is retained in the carousel by a lip 57 (shown in cutaway of unload station 52) when the spool is pushed out of cartridge 54 by shaft 56. Coupling and uncoupling the spool from its cartridge is described in more detail in copending commonly assigned application Ser. No. 318,954, filed Dec. 27, 1972, entitled "Cartridge and Storage Apparatus", invented by D. H. Johnston et al.

Figure 2:
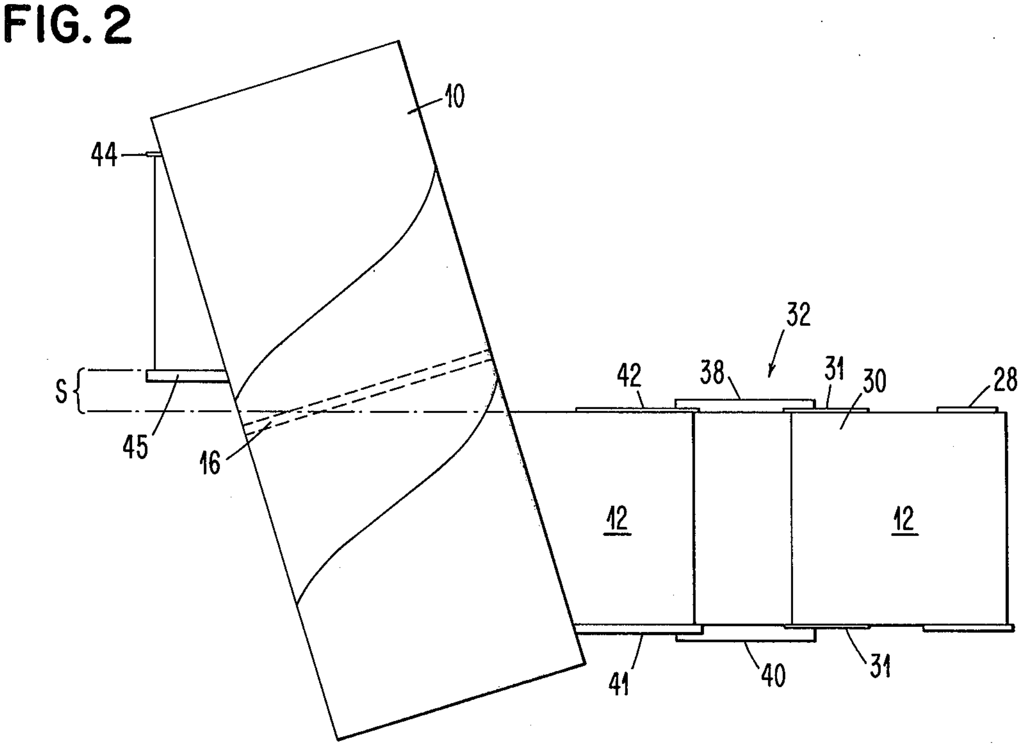
FIG. 2 shows a side view of the preferred embodiment showing the relative position and alignment of guide bearings, vacuum column and mandrel.
Figure 3:
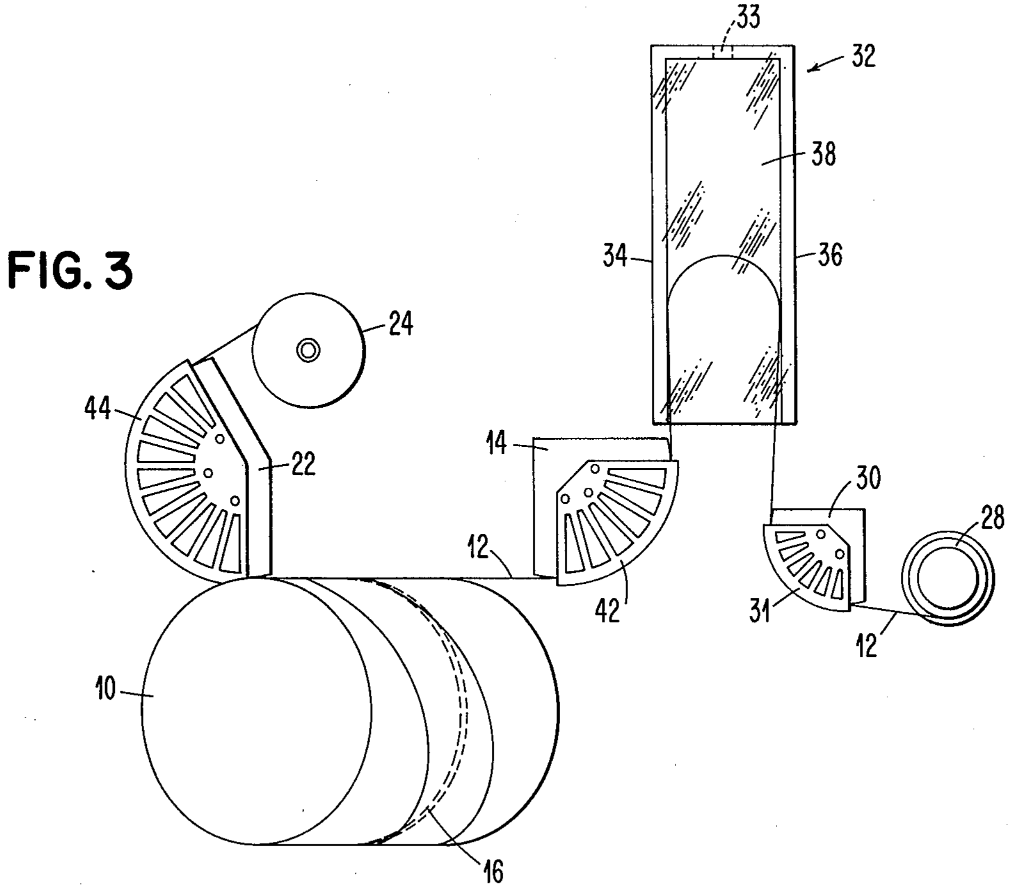
FIG. 3 is a top view of the preferred embodiment showing the relative position of the tape spool, the guide bearings, the mandrel, the vacuum column and the take-up hub.

A side view of the preferred embodiment is shown in FIG. 2, while a top view of the preferred embodiment is shown in FIG. 3. Common elements in FIGS. 1, 2 and 3 have been given the same reference numerals.

To review the tape path as seen in FIGS. 2 and 3, the tape enters the spool guide 30 whose compliant edge guides 31 guide the tape to the vacuum column 32. The vacuum column maintains tension on the tape in cooperation with the take-up reel 24.

From the vacuum column 32 the tape is guided by entry guide 14 onto the mandrel 10. The tape wraps the mandrel 10 helically along the path of the rotating head. The rotating head is carried by the rotor 16. The length of tape wrapped about the mandrel is the portion of the tape whose tape path stability must be maintained to achieve high density data recording and readout.

From the mandrel 10 the tape is guided by the exit guide 22 to the take-up reel 24. Entry guide 14 has a continuous compliant edge guide 42, while exit guide 22 has a continuous compliant edge guide 44. The spacing S between compliant edge guide 42 on the entry guide 14 and fixed edge guide 45 on the exit guide 22 controls the helix angle of the tape 12 as it wraps mandrel 10.

Now referring again to FIG. 1, the preferred embodiment of the invention operates as follows. The region of critical tape path control is defined by the length of tape the wraps the mandrel 10. It is this region over which the rotating heads 18 and 20 scan. Accordingly, this region of the tape must be highly tape-path stable so as to assure good repeatability in reading and writing tracks. Tape path stability is achieved by utilizing continuous compliant entry and exit guides to isolate the region of tape path control from perturbations caused at the tape source and tape sink. In particular, the entry guide 14, by use of its air bearing and continuous compliant edge guide, removes lateral position perturbations, unequal tension perturbations and other stress concentrations in the tape prior to the tape exiting from the entry guide 14 and wrapping the mandrel 10. Similarly, the exit guide 22 with its air bearing surface and continuous compliant guide 44 decouples lateral position perturbations, non-uniform tension perturbations and other stress concentrations that might be caused by the take-up reel 24. The guiding forces, the length of guiding required to provide tape path stability about the mandrel, depends on the size of the perturbations which are being decoupled from the mandrel, the radius of curvature of the entry and exit guides and the guiding force used by the edge guides.

Tape path stability about the mandrel is also a function of the air bearing produced by the mandrel. As hereinafter described, the air bearing is empirically determined by examining variations in thickness of the air bearing as function of tape tension and air pressure in the plenum supplying air to the holes in mandrel 10.

The requirements on the entry guide and exit guide to produce the tape path stability about the mandrel become less stringent if the quality of the tape source and tape sink are increased. In other words, as the tape source and tape sink are improved so that they produce fewer tape path perturbations, the amount of guiding force and the length of guiding required are less stringent prior to the tape wrapping the mandrel 10.

In particular, on the tape supply side, because the spool 28 is automatically positioned, the size of the perturbations introduced into the tape path by the spool could be considerable. These perturbations might be removed by using a relatively long entry guide 14, at least in excess of two times the width of the tape. Alternatively, as shown in the preferred embodiment, additional guidance was provided by spool guide 30 and vacuum column 32 prior to the tape arriving at the entry guide 14. This additional guidance by spool 30 and vacuum column 32 reduces the magnitude of the perturbations in tension and lateral position in tape supplied to the entry guide 14. Therefore, entry guide 14 can be of a fairly short length, and as shown, is approximately a 90° arcuate path having a radius of approximately 1½ inches.

The mandrel itself has a radius of appproximately one and one-half inches, as does the exit guide 22. Since the exit guide 22 is providing the entire decoupling between the tape path wrapping the mandrel and the tape reel 24, exit guide 22 is longer than entry guide 14. In particular, exit guide 22 is approximately 150° of arc.

It will be appreciated by one skilled in the art that radii and the length of arcuate paths over the mandrel and around the guides may be changed while still performing the essential functions of the invention. It is only required that a stable tape path about the mandrel be created by providing guidance to decouple tape source perturbations and guidance to decouple tape sink perturbations. Alternative embodiments of the invention will now be examined.

DESCRIPTION OF ALTERNATIVE EMBODIMENTS

Figure 4:
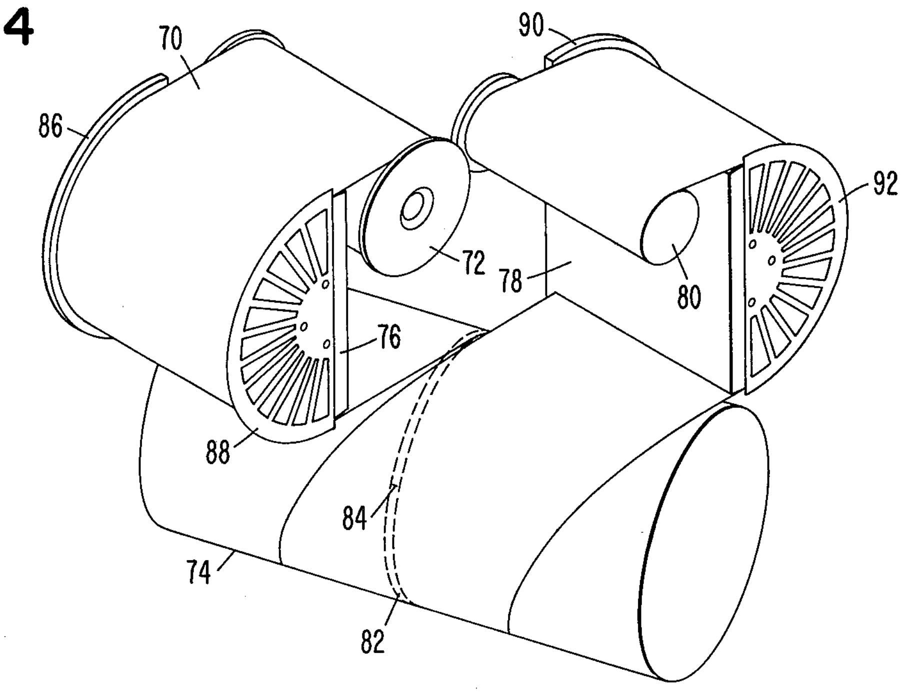
FIG. 4 is a perspective view of an alternative embodiment utilizing reel-to-reel drive and longer guide bearings.

In FIG. 4 a very compact tape path configuration is shown for stabilizing the portion of the path wrapping the mandrel. Tape 70 is supplied from a tape source, spool 72. The tape is guided to the mandrel 74 by the source guide 76. After wrapping the mandrel, tape 70 is guided by sink guide 78 to the tape sink, take-up reel 80. The path of the rotating head is defined by rotor 82 in the center of the mandrel carrying the magnetic head 84.

The tape 70 wraps 360° about the mandrel 74 and is decoupled from the tape source 72 and tape sink 80 by source guide 76 and sink guide 78. Source guide 76 and sink guide 78 act substantially in the same manner as entry guide 14 and exit guide 22 respectively, previously described with reference to FIG. 1. The source and sink guides decouple disturbances from the tape source of tape sink from the portion of the tape path which wraps the mandrel.

The tape path is entirely air bearing from the time the tape enters onto the source guide 76 until the time the tape leaves the sink guide 78. The air bearing in this alternative embodiment is achieved by use of porous surface materials on the mandrel and guides through which air may be forced to create the hydrostatic air bearing about the surface of the mandrel and about the surface of guides.

Source guide 76 has a fixed edge guide 86 and a continuous compliant edge guide 88. Continuous compliant guide 88 guides the tape against the reference edge provided by fixed guide 86. The air bearing of guide 76 in combination with the continuous compliant edge guide 88 of guide 76 isolates disturbances in tape tension, tape lateral position and tape stress concentrations that might be caused by the tape source 72.

Similarly, guide 78 has a fixed edge guide 90 and a compliant edge guide 92. The continuous compliant edge guide 92 guides the tape by referencing it to the fixed guide 90. Further, the continuous compliant guiding by sink guide 78 isolates tape wrapped about the mandrel 74 from tension, position or stress disturbances in the tape that might be caused by the tape sink 80.

Figure 5:
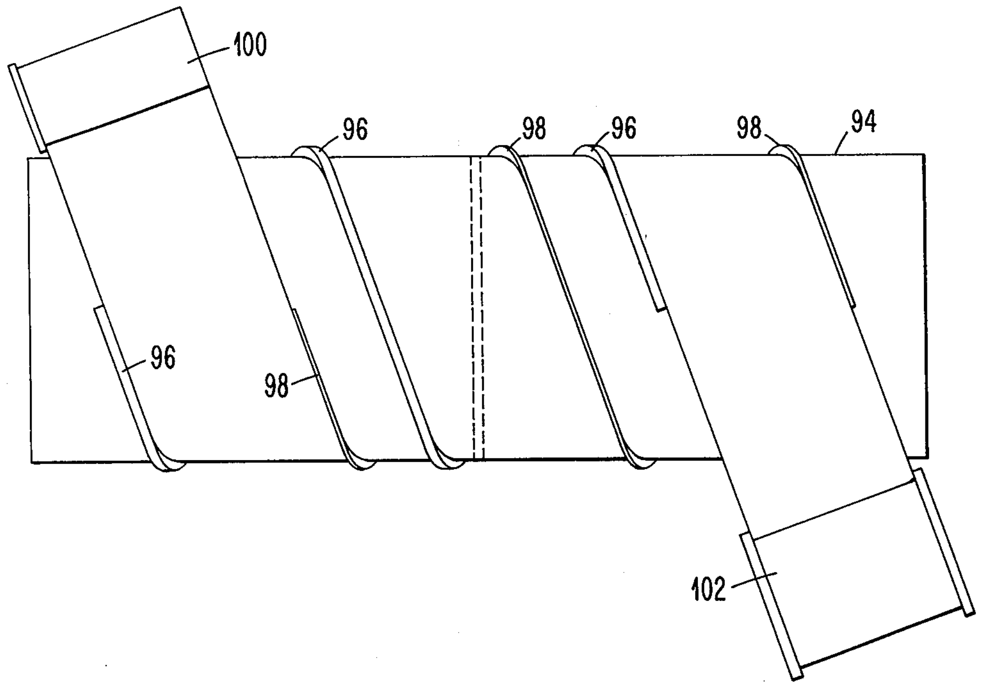
FIG. 5 is an alternative embodiment wherein the guide bearings have been placed on the mandrel by wrapping the tape 720° so as to insure tape path stability prior to the tape wrapping the mandrel along the path of the rotating head.

Yet another alternative embodiment of the invention is shown in FIG. 5. In this embodiment the entry and exit guides have been incorporated into the mandrel 94. The length of the mandrel 94 is extended and the tape is wrapped an additional 180° on each side of the 360° wrap that covers the path of the rotating head. The 360° wrap that covers the head, is the tape path portion whose stability must be maintained for high density recording.

The tape is guided about the mandrel by a fixed guide 96 and a compliant edge guide 98. The continuous compliant guiding of the tape could be limited to the entry and exit regions of the mandrel prior to the 360° wrap about the rotating head path. However, as shown, the continuous compliant guiding continues for the whole 720° wrap and includes the region of tape path stability along the path of the rotating head. Such guidance will provide extremely high stablity of tape path and enable very high data recording densities.

As shown in FIG. 5, the tape is supplied from a supply reel 100 and taken up by a take-up reel 102. In FIG. 5, a reel-to-reel drive system is shown; however, it should be obvious to one skilled in the art that a capstan might be inserted between one of the reels and the mandrel and, if desired, vacuum columns might also be inserted between the reels and the mandrel.

A number of configuration for implementing the invention have been shown. To best understand the alternatives, guide-force graphs are shown in FIGS. 6 and 7.

Figure 6:
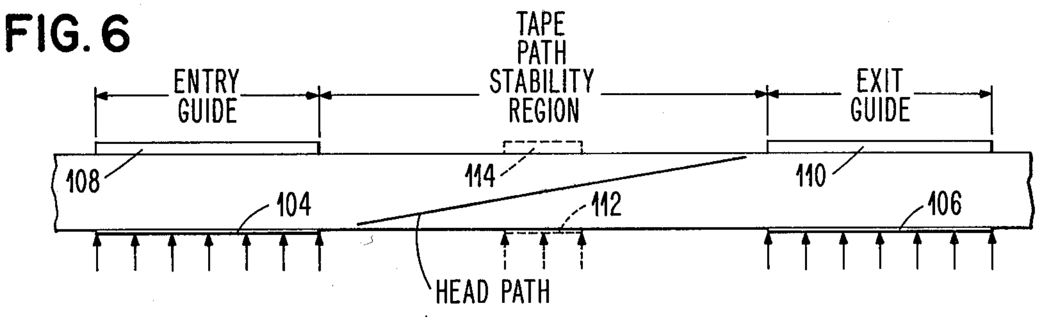
FIG. 6 is a schematic diagram of guidance of the tape with the tape rolled out flat, indicating guided portions and the tape path stability region.
Figures 7, 8:
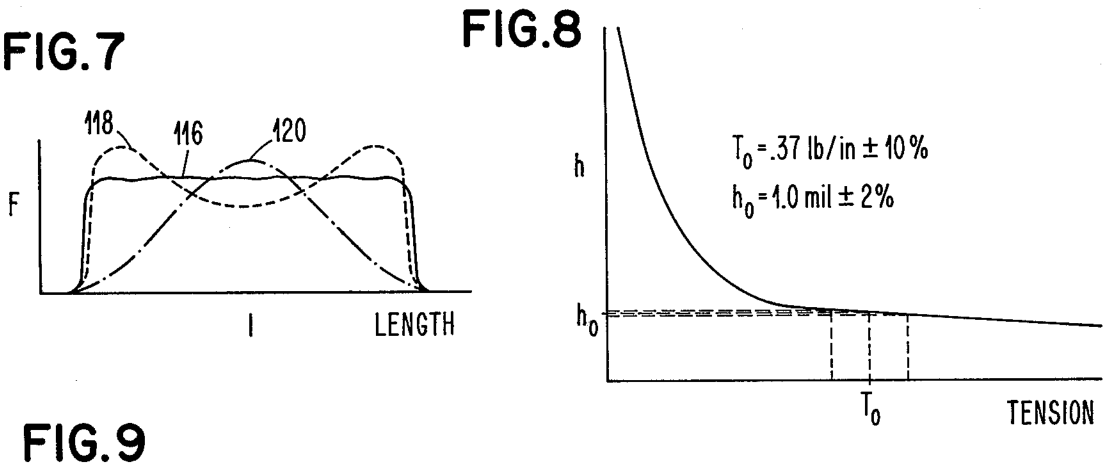
FIG. 7 is a graph showing desirable and undesirable edge guiding force distributions.
FIGS. 8 and 9 show empirically determined design criteria in the selection of tape tension and air bearing pressure to achieve a stable air bearing for the tape as it wraps the mandrel.

In FIG. 6 a schematic diagram of the tape path is shown. The tape has been layed out flat with the regions of entry guide, exit guide and path stability indicated.

Compliant guides 104 and 106 are shown referencing the tape to fixed edge guides 108 and 110 respectively. Typically, compliant guidance of the tape will only occur in the entry guide and exit guide regions. However, for very high stability it may be desirable to add guides to the path stability region (the region of helically wrapped tape on the mandrel). Accordingly, a compliant guide 112 is shown guiding tape in the path stability region relative to a fixed guide 114. The length of continuous compliant edge guiding used in the path stability region might vary from a few degrees of arc mounted midway in the region to continuously guiding the tape all the way through the region. The following table gives five different examples of guidance combinations that might be used to achieve a path stability region. It will be appreciated by one skilled in the art that there are many other combinations of arcuate paths with compliant guidance that might be used to achieve the path stability region.

| Examples | Entry Guide | Path Stability Region | | Exit Guide |
|---|---|---|---|---|
| I | 90° | 360° | | 150° |
| II | 180° | 360° | | 180° |
| III | 180° | 360° | (Guided) | 180° |
| IV | 90° | 360° | (10° Guided) | 150° |
| V | 135° | 270° | | 135° |

Example 1 in the above table corresponds to the preferred embodiment shown in FIGS. 1, 2 and 3. Example 2 corresponds to alternative embodiment shown in FIG. 4, while Example 3 corresponds to the alternative embodiment shown in FIG. 5. Example 4 is similar to Example 1 except that 10° of continuous compliant guiding on the mandrel at the midpoint of the wrap of the mandrel is called for. Example 5 indicates that the entry and exit regions might be shortened as well as the path stability region. The path stability region would be shortened by helically wrapping the mandrel less than 360°; in Example 5 the helical wrap is only 270°.

Referring now to FIG. 7, a guide force diagram for continuous compliant guide is shown. Continuous compliant guides are more completely described in the cross-referenced related application Ser. No. 335,609, filed Feb. 26, 1973. The most desirable force diagram produced by a continuous compliant guide along its guiding length is that represented by curve 116. The guide force along a guided length represented by curve 118 is also acceptable and is stable since it does produce continuous guide force along the length with higher guide forces at each end of the guided length.

The guide force along the guided length represented by curve 120 is unacceptable as the guide force peaks at the center of the guided length and decreases gradually from there to each end of the guided length. A guide force corresponding to curve 120 would tend to buckle the tape and likely introduce further disturbances to the tape path rather than decoupling or isolating disturbances outside the guided length from the path stability region.

Another factor in designing a region of path stability about a mandrel is the air bearing produced by the mandrel. As previously described for the preferred embodiment and alternative embodiments, an air bearing may be achieved by forcing air through a porous surface of a mandrel, or by forcing air through very small holes (in the order of 5 mils) in the surface of the mandrel.

In designing the air bearing it is desirable to achieve an air bearing thickness between mandrel and tape that is highly stable irrespective of variations in tension on the tape and air pressure generating the air bearing.

The air pressure is applied to a plenum in the mandrel and forces air through the surface of the mandrel to produce the air bearing.

Figure 9:
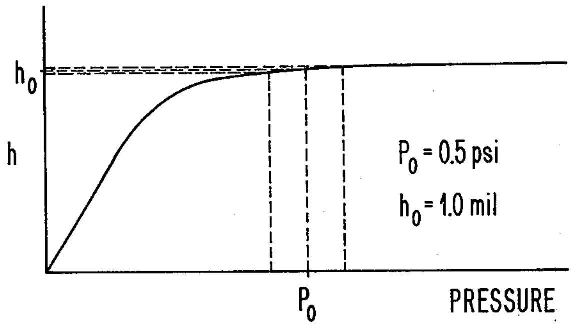

FIGS. 8 and 9 are graphs of air bearing thickness or height $h$ of the tape above the mandrel as a function of tension and pressure. Data for the graphs must be empirically determined during the design of a mandrel. The shape of the graph will be substantially as shown in both FIGS. 8 and 9. In FIG. 8, as tape tension approaches zero, the height of the tape or air bearing thickness approaches infinity. In FIG. 9, as air bearing pressure goes to zero, the thickness of the air bearing goes to zero. Note that both of the curves have a knee and subsequently, at high pressures and higher tensions, tend to flatten out. The design criteria is then to select a tension and a pressure in a portion of the graph that is past the knee and relatively flat. In the preferred embodiment nominal tension $T_o$ is selected at 0.37 pounds per inch plus or minus 10%, and nominal height $h_o$ is then 1 mil plus or minus 2%. At the same time, nominal pressure $P_o$ for a mandrel having approximately 5 mil holes in its surface is 0.5 pounds per square inch plus or minus 10%, and nominal height $h_o$ is again 1 mil plus or minus 2%.

Figure 10:
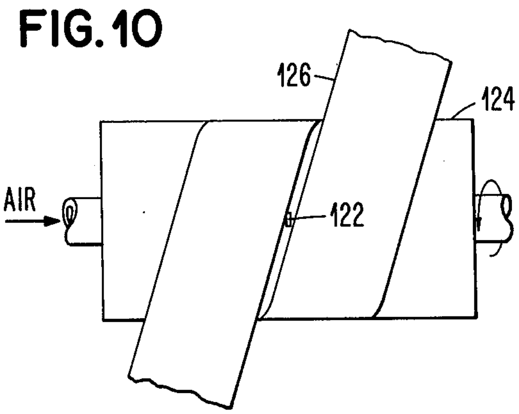
FIG. 10 shows an alternative embodiment for achieving an air bearing over the mandrel by use of a porous rotating drum carrying the magnetic head.
Figure 11:
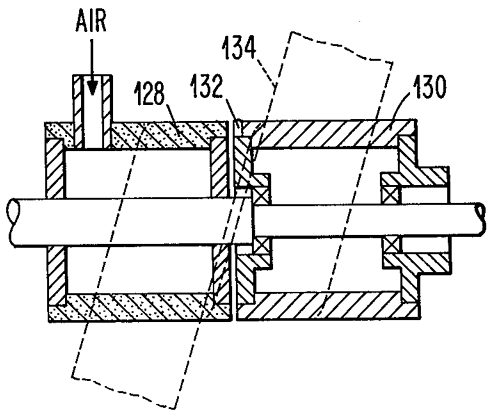
FIG. 11 shows an alternative embodiment for the air bearing mandrel wherein the air bearing is achieved by a hydrostatic air bearing on half of the mandrel and a hydrostatic air bearing on the other half of the mandrel.

Alternative embodiments for air bearing mandrels are shown in FIGS. 10 and 11. FIG. 10 shows an air bearing produced by a mandrel which is rotating and also has pores or holes through which air is forced. This produces a combination hydrostatic/hydrodynamic bearing. In FIG. 10 magnetic head 122 is mounted directly to the surface of the rotating mandrel 124. Therefore, as the mandrel rotates the head sweeps at an acute angle across the tape 126 which is helically wrapped about the mandrel.

A hydrodynamic air bearing could be used alone since the mandrel 124 is rotating. The velocity of the rotating mandrel would draw in air under the tape and support the tape as it helically wraps the mandrel. The height of the tape above a rotating mandrel in region of uniform height is given by the expression:

$$h = .643 r_o \quad \frac{6 \mu V}{T}^{2/3}$$

where:

$r_0$ = radius of mandrel,
$\mu$ = viscosity of air,
$V$ = velocity,
$T$ = tension.

However, such a configuration usually has the fault that tape may touch down on the rotating mandrel at various points, especially at the point where the tape exits from the mandrel. The addition of a hydrostatic air bearing produced by forcing air through holes or pores in the surface of the mandrel eliminates the tendency of the tape to touch down on the rotating mandrel.

In FIG. 11 a mandrel is shown that produces an air bearing by having half of the mandrel rotate and the other half of the mandrel porous. Mandrel half 128 has a surface made from a porous material through which air may be forced to produce a hydrostatic air bearing under the tape. Mandrel half 130 has a non-porous surface which is rotating at high speed to produce a hydrodynamic bearing under the tape. The magnetic heads 132 are mounted at the center edge of mandrel half 130. Thus, as mandrel half 130 rotates, it carries the heads 132 along a rotary path to scan the magnetic tape 134 helically wrapped about the mandrel.

While the invention has been particularly shown and described with reference to a preferred embodiment and several alternative embodiments thereof, it will be appreciated by those skilled in the art that the foregoing and other changes in form and details may be made therein without departing from the spirit and scope of the invention.

What is claimed is:

1. In a tape transport for moving magnetic tape from a tape source around a mandrel to a tape sink wherein the mandrel surface radially guides the tape along the path of a rotating magnetic transducing means for writing and reading slant tracks on the tape, the improvement comprising:

means for supporting the tape above the mandrel surface with a stable air bearing as the tape wraps the mandrel;

source guide means mounted between the source and the air bearing mandrel for compliantly edge guiding the tape continuously for a first predetermined length from a point adjacent the tape source to a point adjacent the air bearing mandrel;

said source guide means being transversely and pivotally compliant and said first predetermined length being sufficient to allow said transversely and pivotally compliant source guide means to decouple perturbations in tape movement generated at the source from the section of tape wrapping the air bearing mandrel;

sink guide means mounted between the air bearing mandrel and the sink for compliantly edge guiding the tape continuously for a second predetermined length from a point adjacent the air bearing mandrel to a point adjacent the tape sink;

said sink guide means being transversely and pivotally compliant and said second predetermined length being sufficient to allow said transversely and pivotally compliant sink guide means to decouple perturbations in tape movement generated at the sink from the section of tape wrapping the air bearing mandrel.

2. In the tape transport of claim 1, the improvement further comprising:

said supporting means supporting the tape above the mandrel surface with a stable air bearing having a substantially invariant thickness between tape and mandrel irrespective of variations in tape tension or air bearing pressure.

3. The improvement in the tape transport of claim 2 wherein said supporting means comprises:

a porous cylindrical surface for said mandrel, means for supplying air at a predetermined pressure inside the mandrel so that air flowing through the porous cylindrical surface will form the air bearing, said pressure being predetermined such that variations of less than 10% in tape tension and/or air bearing pressure will cause less than 2% variations in air bearing thickness.

4. The improvement in the tape transport of claim 2 wherein said supporting means comprises:

a cylindrical surface for said mandrel having holes less than 10 mils in diameter distributed in the tape path around the mandrel;

means for supplying air at a predetermined pressure inside the mandrel so that air flowing through the porous cylindrical surface will form the air bearing, said pressure being predetermined such that variations of less than 10% in tape tension and/or air bearing pressure will cause less than 2% variations in air bearing thickness.

5. The improvement in the tape transport of claim 2 wherein both said source guide means and said sink guide means comprise:

arcuate air bearing surfaces for supporting the tape as the tape moves across said guides;

continuous pivotally-and-transversely compliant edge guides for edge guiding the tape with a guide force that is substantially uniform along the entire guided length of said guides.

6. Apparatus for accurately transporting magnetic tape past a magnetic transducing means mounted on a rotor so that slant tracks of high data density may be written on the tape and read from the tape, said apparatus comprising:

an air bearing mandrel having two sections each of which flanks the rotor so that the tape may helically wrap the mandrel along the path of the rotating transducing means;

a tape supply means for supplying tape to said mandrel;

a tape take-up means pulling against said tape supply means for taking up tape under tension after the tape has wrapped said mandrel;

an entry guide means extending continuously from a point adjacent said supply means to a point adjacent said mandrel for guiding tape for a first predetermined length along an arcuate path from said supply means to said mandrel, said entry guide means being air bearing and having pivotally and transversely compliant edge guiding of the tape continuously for said first predetermined length between said supply means and said mandrel;

an exit guide means extending continuously from a point adjacent said mandrel to a point adjacent said take-up means for guiding tape for a second predetermined length along an arcuate path from said mandrel to said take-up means, said exit guide means being air bearing and having pivotally and transversely compliant edge guiding of the tape continuously for said second predetermined length between said mandrel and said take-up means;

said first and second predetermined lengths being sufficient to allow the pivotal and transverse compliance of said entry guide means and said exit guide means to reduce tape disturbances in the tape wrapping said air bearing mandrel, whereby the path of the tape as the tape helically wraps the mandrel is accurately controlled irrespective of disturbances originating at said tape supply means and said tape take-up means respectively.

7. The apparatus of claim 6 wherein said tape supply means comprises:

a spool for carrying a supply of tape and for unwinding the tape as required to supply said mandrel;

means for carrying a plurality of said spools;

means for moving said spools between said carrying means and a position where said spool can unwind tape to supply said mandrel.

8. The apparatus of claim 6 wherein said tape supply means comprises:

a spool for carrying a supply of tape and for unwinding the tape as required to supply said mandrel;

a constant force buffer means between said spool and said entry guide means for controlling tension of the tape between said buffer means and said tape take-up means.

9. The apparatus of claim 8 wherein said tape supply means further comprises:

a spool guide means mounted between said spool and said buffer means for compliantly edge guiding the tape continuously from said spool to said buffer means to reduce tape disturbances caused by said spool before the tape reaches said entry guide means.

10. Method for creating a tape path region of high stability for tape along the path of a rotating head comprising the steps of:

helically wrapping the tape in the region of high stability about an air bearing mandrel which supports the tape along the path of the rotating head, the thickness of the air bearing being relatively invariant with variations in tape tension or air bearing pressure;

decoupling the high stability region of the tape from tape source and tape sink disturbances to the tape by continuously edge guiding the tape over air bearings for a predetermined length before and after the high stability region;

said edge guiding step being pivotally and transversely compliant for said predetermined length before and after the high stability region;

said predetermined length being long enough so that position and motion disturbances in the tape at the tape source or tape sink are reduced by the pivotal and transverse compliance of said guiding step to an acceptable level in the tape inside the high stability region.

11. The method of claim 10 wherein said decoupling step comprises the steps of:

helically wrapping the tape about the air bearing mandrel for said predetermined length in both an entry region on the mandrel before and an exit region on the mandrel after the helical wrap in the region of high stability;

mounting continuous pivotally-and-transversely-compliant tape edge guides on the mandrel in the entry region and the exit region so that the high stability region is decoupled from tape source and tape sink disturbances.

12. The method of claim 10 wherein said decoupling step comprises:

wrapping the tape about an arcuate air bearing entry guide of said predetermined length immediately adjacent the mandrel and before the tape wraps the mandrel;

wrapping the tape about an arcuate air bearing exit guide of said predetermined length immediately adjacent the mandrel and after the tape wraps the mandrel;

mounting continuous pivotally-and-transversely-compliant tape edge guides on said entry and exit guides so that the high stability region is decoupled from tape source and tape sink disturbances.

13. The method of claim 10 comprising in addition the step of:

guiding the tape while the tape is in the tape source to reduce disturbances in the tape caused by the tape source.

14. The method of claim 10 comprising in addition the step of:

guiding the tape while the tape is in the region of high stability to further increase tape path stability along the path of the rotating head.

15. The method of claim 10 wherein the air bearing for the mandrel is generated by the steps of:

forcing air through holes or pores in the cylindrical surface of a first half of the mandrel to produce a hydrostatic air bearing between the tape and the first half of the mandrel;

rotating the second half of the mandrel to produce an air bearing that is substantially hydrodynamic between the tape and the second half of the mandrel.

16. The method of claim 10 wherein the air bearing for the mandrel is generated by the step of:

forcing air through holes or pores in the cylindrical surface of the mandrel with air at a preselected pressure, said pressure being selected to make the thickness of the air bearing relatively invariant with variations in tape tension or air bearing pressure.

17. The method of claim 16 and in addition the step of:

rotating the mandrel to thereby generate a combination hydrostatic/hydrodynamic air bearing between the tape and the mandrel.

* * * * *